United States Patent
Sato

(10) Patent No.: US 10,138,361 B2
(45) Date of Patent: *Nov. 27, 2018

(54) RUBBER COMPOSITION AND PNEUMATIC TIRE

(71) Applicant: SUMITOMO RUBBER INDUSTRIES, LTD., Kobe-shi, Hyogo (JP)

(72) Inventor: Daisuke Sato, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 402 days.

This patent is subject to a terminal disclaimer.

(21) Appl. No.: 14/406,251

(22) PCT Filed: Jul. 4, 2013

(86) PCT No.: PCT/JP2013/068319
§ 371 (c)(1),
(2) Date: Dec. 8, 2014

(87) PCT Pub. No.: WO2014/007309
PCT Pub. Date: Jan. 9, 2014

(65) Prior Publication Data
US 2015/0126674 A1 May 7, 2015

(30) Foreign Application Priority Data
Jul. 5, 2012 (JP) .................... 2012-151543

(51) Int. Cl.
| | |
|---|---|
| *C08L 9/06* | (2006.01) |
| *B60C 1/00* | (2006.01) |
| *C08L 9/00* | (2006.01) |
| *C08L 15/00* | (2006.01) |
| *C08C 19/00* | (2006.01) |
| *C08L 3/04* | (2006.01) |
| *C08K 3/04* | (2006.01) |
| *C08K 3/36* | (2006.01) |

(52) U.S. Cl.
CPC ............ *C08L 9/06* (2013.01); *B60C 1/00* (2013.01); *B60C 1/0016* (2013.01); *B60C 1/0025* (2013.01); *C08C 19/00* (2013.01); *C08L 3/04* (2013.01); *C08L 9/00* (2013.01); *C08L 15/00* (2013.01); *C08K 3/04* (2013.01); *C08K 3/36* (2013.01); *C08L 2205/03* (2013.01); *C08L 2207/324* (2013.01)

(58) Field of Classification Search
CPC .......... C08L 9/06; C08L 9/00; C08L 2205/03; C08L 15/00; C08L 3/04; B60C 1/00; B60C 1/0016; B60C 1/0025
See application file for complete search history.

(56) References Cited

U.S. PATENT DOCUMENTS

| | | | |
|---|---|---|---|
| 6,407,165 B1 * | 6/2002 | Wang | ............... C08K 5/01 152/525 |
| 2004/0024093 A1 | 2/2004 | Weydert et al. | |
| 2005/0228107 A1 | 10/2005 | Lin et al. | |

FOREIGN PATENT DOCUMENTS

| | | | |
|---|---|---|---|
| JP | 2000-344955 A | | 12/2000 |
| JP | 2002-3650 A | | 1/2002 |
| JP | 2002-114874 A | | 4/2002 |
| JP | 2003-253051 A | | 9/2003 |
| JP | 2009-114257 A | | 5/2009 |
| JP | 2009-287018 A | | 12/2009 |
| JP | 2010-168469 A | | 8/2010 |
| JP | 2010-174109 A | | 8/2010 |
| JP | 2010-196004 | * | 9/2010 |
| JP | 2010-196004 A | | 9/2010 |
| JP | 2266819 A1 | | 12/2010 |

OTHER PUBLICATIONS

Database WPI, AN 2004-194500, Thomson Scientific, London, GB; Week 200419, XP002752330, 3 pages. Nakagawa et al. "Rubber Composisition Contains Styrene . . . ".
Database WPI, AN 2010-L46044, Thomson Scientific, London, GB; Week 201063, XP002752329, 2 pages. Chino et al. "Diene Rubber Composition . . . ".
International Search Report, issued in PCT/jP2013/068319, dated Aug. 13, 2013.

* cited by examiner

*Primary Examiner* — Peter D. Mulcahy
(74) *Attorney, Agent, or Firm* — Birch, Stewart, Kolasch & Birch, LLP

(57) ABSTRACT

The present invention provides a rubber composition capable of improving fuel economy and wet grip performance while maintaining good processability, abrasion resistance and handling stability or improving them, as well as a pneumatic tire including the rubber composition. The rubber composition contains carbon black, silica, and a polymer mixture obtained by modifying a polymer derived from a conjugated diene compound and/or an aromatic vinyl compound with a compound containing an ester group and/or a carboxyl group, the polymer mixture having a weight average molecular weight of from $1.0 \times 10^3$ to $1.0 \times 10^5$, the rubber composition having a tan δ peak temperature of −20° C. or higher, a rubber hardness of from 63 to 75, and a tan δ at 70° C. of from 0.15 to 0.45.

12 Claims, No Drawings

RUBBER COMPOSITION AND PNEUMATIC TIRE

TECHNICAL FIELD

The present invention relates to a rubber composition and a pneumatic tire including the rubber composition.

BACKGROUND ART

For resource saving, energy saving, and environmental protection, the society increasingly demands reduction in carbon dioxide gas emission. In order to also reduce the carbon dioxide gas emission of cars, various measures have been considered, including for example car weight reduction and the use of electric energy.

A common challenge in the automotive field is the need to enhance fuel economy by improving the rolling resistance of tires, and there are also increasing demands for enhanced safety during driving and enhanced durability. Since these properties greatly depend on the performance of tires, tires for cars are increasingly required to have improved fuel economy, wet grip performance, handling stability, and durability (e.g. abrasion resistance). The performance of tires depends on various factors, including the structure and materials of tires, and greatly depends particularly on the performance of the rubber composition used in the tread part which comes into contact with the road surface. For this reason, a wide range of studies have been undertaken to technically improve rubber compositions for tires such as for treads and these techniques have been put into practical use.

It is known to improve the fuel economy of a rubber composition by reducing the amount of filler or by using a modified polymer (see, for example, Patent Literature 1). However, when the amount of filler is reduced or when filler is highly dispersed, rubber stiffness tends to be reduced, which leads to the problem of decrease in kinematic performance (e.g. handling stability) of tires.

CITATION LIST

Patent Literature

Patent Literature 1: JP 2000-344955 A

SUMMARY OF INVENTION

Technical Problem

The present invention aims to solve the above problems and provide a rubber composition capable of improving fuel economy and wet grip performance while maintaining good processability, abrasion resistance and handling stability or improving them, as well as a pneumatic tire including the rubber composition.

Solution to Problem

The present invention relates to a rubber composition, containing: carbon black; silica; and a polymer mixture obtained by modifying a polymer derived from at least one of a conjugated diene compound and an aromatic vinyl compound with a compound containing at least one of an ester group and a carboxyl group, the polymer mixture having a weight average molecular weight of from $1.0 \times 10^3$ to $1.0 \times 10^5$, the rubber composition having a tan $\delta$ peak temperature of $-20°$ C. or higher, a rubber hardness of from 63 to 75, and a tan $\delta$ at $70°$ C. of from 0.15 to 0.45.

The compound containing at least one of an ester group and a carboxyl group may suitably be at least one of an acrylic acid ester and a carboxylic anhydride, more suitably a carboxylic anhydride.

Preferably, the rubber composition contains, per 100 parts by mass of a rubber component, 5 to 150 parts by mass of the carbon black, 10 to 150 parts by mass of the silica, and 0.5 to 50 parts by mass of the polymer mixture.

The polymer mixture preferably contains a modified polymer containing a modified group represented by the following formula (1):

wherein A represents a divalent saturated or unsaturated hydrocarbon group; $R^1$ represents $OR^4$ or a group represented by the formula (2) below; and $R^4$ represents a hydrogen atom or a monovalent saturated or unsaturated hydrocarbon group, the formula (2) being:

wherein B represents a divalent saturated or unsaturated hydrocarbon group; and $R^5$ represents a hydrogen atom or a monovalent saturated or unsaturated hydrocarbon group.

Preferably, A is represented by the following formula (3):

wherein m represents an integer of from 0 to 6; and $R^2$ and $R^3$ are the same as or different from each other and each represent a hydrogen atom, a $C_{1-2}$ hydrocarbon group, or an aryl group, and B is represented by any one of the following formulas (4) to (7):

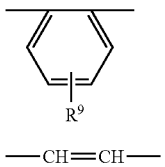

(6)

—CH=CH—  (7)

wherein n represents an integer of 2 or 3; $R^6$ and $R^7$ are the same as or different from each other and each represent a hydrogen atom or a $C_{1-18}$ hydrocarbon group; $R^8$ represents a hydrogen atom or a methyl group; and $R^9$ represents a hydrogen atom or a $C_{1-4}$ hydrocarbon group.

In the polymer mixture, the modified group is preferably present in a proportion of at least 0.1 groups on average per molecule of the polymer in the polymer mixture.

Moreover, the polymer mixture preferably has a viscosity at 25° C. of from $1.0\times10^4$ to $8.0\times10^5$.

The polymer in the polymer mixture is preferably a styrene homopolymer, a butadiene homopolymer, or a styrene-butadiene copolymer. Such a polymer mixture preferably has a styrene content of from 5 to 45% by mass.

The polymer mixture preferably contains a backbone-modified polymer.

The silica preferably includes silica (1) that has a nitrogen adsorption specific surface area of at least 50 m²/g but less than 120 m²/g and silica (2) that has a nitrogen adsorption specific surface area of 120 m²/g or more.

The nitrogen adsorption specific surface areas and amounts of such silicas (1) and (2) preferably satisfy the following formula:

(Nitrogen adsorption specific surface area of silica (2))/(Nitrogen adsorption specific surface area of silica (1))≥1.4; and (Amount of silica (1))×0.06≤(Amount of silica (2))≤ (Amount of silica (1))×15.

The present invention relates to a rubber composition for tires, containing the aforementioned rubber composition.

The present invention also relates to a pneumatic tire, formed from the rubber composition.

Advantageous Effects of Invention

The present invention involves the provision of a rubber composition containing carbon black, silica, and a polymer mixture obtained by modifying a polymer derived from a conjugated diene compound and/or an aromatic vinyl compound with a compound containing an ester group and/or a carboxyl group, the polymer mixture having a weight average molecular weight of from $1.0\times10^3$ to $1.0\times10^5$, the rubber composition having a tan δ peak temperature of −20° C. or higher, a rubber hardness of from 63 to 75, and a tan δ at 70° C. of from 0.15 to 0.45, and thereby improves fuel economy and wet grip performance while maintaining good processability, abrasion resistance and handling stability or improving them.

DESCRIPTION OF EMBODIMENTS

The rubber composition of the present invention contains carbon black, silica, and a polymer mixture obtained by modifying a polymer derived from a conjugated diene compound and/or an aromatic vinyl compound with a compound containing an ester group and/or a carboxyl group, the polymer mixture having a weight average molecular weight of from $1.0\times10^3$ to $1.0\times10^5$, the rubber composition having a tan δ peak temperature of −20° C. or higher, a rubber hardness of from 63 to 75, and a tan δ at 70° C. of from 0.15 to 0.45.

The polymer mixture is obtained by reacting all or part of the polymer derived from a conjugated diene compound and/or an aromatic vinyl compound with the aforementioned compound. The polymer mixture contains a modified polymer which is the reaction product with the aforementioned compound, and optionally the unmodified polymer which has not been reacted with the aforementioned compound. The polymer mixture also has a specific weight average molecular weight. By combining such a component with silica and carbon black and setting the tan δ peak temperature, rubber hardness, and tan δ at 70° C. of the rubber composition to certain values, it is possible to improve fuel economy and wet grip performance while maintaining good processability, abrasion resistance and handling stability or improving them.

The polymer derived from a conjugated diene compound and/or an aromatic vinyl compound is preferably a copolymer of a conjugated diene compound and an aromatic vinyl compound or a homopolymer of a conjugated diene compound, more preferably a copolymer of a conjugated diene compound and an aromatic vinyl compound, because they provide good processability, abrasion resistance, handling stability, fuel economy, and wet grip performance.

Examples of the conjugated diene compounds include 1,3-butadiene, isoprene, 1,3-pentadiene, 2,3-dimethylbutadiene, 2-phenyl-1,3-butadiene, and 1,3-hexadiene. These may be used alone or in combination of two or more. From a practical point of view, such as for easy availability of monomer, preferred among these is 1,3-butadiene or isoprene, with 1,3-butadiene being more preferred.

Examples of the aromatic vinyl compounds include styrene, α-methylstyrene, 1-vinylnaphthalene, 3-vinyltoluene, ethylvinylbenzene, divinylbenzene, 4-cyclohexylstyrene, and 2,4,6-trimethylstyrene. These may be used alone or in combination of two or more. Styrene is especially preferred among these from a practical point of view, such as for easy availability of monomer.

It should be noted that 1,3-butadiene may be used to prepare a butadiene homopolymer, or styrene may be used to prepare a styrene homopolymer, or 1,3-butadiene and styrene may be used to prepare a styrene-butadiene copolymer.

The polymer derived from a conjugated diene compound and/or an aromatic vinyl compound is preferably a styrene homopolymer, a butadiene homopolymer, or a styrene-butadiene copolymer, more preferably a butadiene homopolymer or a styrene-butadiene copolymer, and still more preferably a styrene-butadiene copolymer.

The polymer mixture may be synthesized for example by preparing a polymer polymerized from a conjugated diene compound and/or an aromatic vinyl compound, optionally hydrogenating the polymer, and then reacting the resulting polymer with a compound containing an ester group and/or a carboxyl group. Specifically, it may be synthesized as follows.

A conjugated diene compound and/or an aromatic vinyl compound may be polymerized by any conventionally known method without limitations. A specific example thereof is a method in which a conjugated diene compound and/or an aromatic vinyl compound are subjected to anionic polymerization in an organic solvent inert to the reaction (e.g. a hydrocarbon solvent such as an aliphatic, alicyclic, or aromatic hydrocarbon compound) in the presence of an organolithium compound as a polymerization initiator and optionally a randomizer.

The hydrocarbon solvent is not particularly limited and is preferably a $C_{3-8}$ hydrocarbon solvent. Examples thereof include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene.

The organolithium compound preferably contains a $C_{2-20}$ alkyl group. Examples of thereof include ethyllithium, n-propyllithium, isopropyllithium, n-butyllithium, sec-butyllithium, tert-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, and a reaction product of diisopropylbenzene and butyllithium. In view of easy availability, safety and the like, n-butyllithium or sec-butyllithium is preferred among these.

The randomizer refers to a compound functioning, for example, to control the microstructure of the conjugated diene part of a copolymer (e.g. the increase of the proportion of 1,2-linkage of butadiene portions) and the compositional distribution of monomer units in a copolymer (e.g. randomization of the butadiene units or styrene units in a butadiene-styrene copolymer). The randomizer is not particularly limited and may be any conventionally known compound that is generally used as a randomizer. Examples thereof include ethers and tertiary amines, such as dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylenediamine, and 1,2-dipiperidinoethane. Besides, potassium salts, such as potassium-t-amylate and potassium-t-butoxide, and sodium salts, such as sodium-t-amylate, may also be used.

The amount of randomizer is preferably 0.01 molar equivalents or more, more preferably 0.05 molar equivalents or more, per mole of polymerization initiator. The addition of less than 0.01 molar equivalents of randomizer tends to produce a small effect and not to easily effect randomization. The amount of randomizer is also preferably 1000 molar equivalents or less, more preferably 500 molar equivalents or less, per mole of polymerization initiator. The use of more than 1000 molar equivalents of randomizer tends to greatly change the reaction rate of monomers and rather not to easily effect randomization.

The method for the polymerization is not particularly limited, and may be any of solution polymerization, gas phase polymerization, and bulk polymerization. In particular, solution polymerization is preferred in view of the freedom of the polymer design, processability and the like. Moreover, the polymerization may be performed either in a batch mode or a continuous mode.

In the case of solution polymerization, the monomer concentration in the solution (the combined amount of monomers including the conjugated diene compound and the aromatic vinyl compound) is preferably 5% by mass or more, more preferably 10% by mass or more. If the monomer concentration in the solution is less than 5% by mass, then the copolymer tends to be produced in a small amount and the cost tends to increase. The monomer concentration in the solution is also preferably 50% by mass or less, more preferably 30% by mass or less. If the monomer concentration in the solution is more than 50% by mass, the solution tends to have an excessively high viscosity and to be difficult to stir and polymerize.

The polymer in the polymer mixture in the present invention may be hydrogenated. In this case, the polymer obtained through the polymerization reaction is further hydrogenated to prepare a hydrogenated polymer, which is then modified with the aforementioned compound to synthesize a desired hydrogenated polymer mixture.

The polymer may be hydrogenated by a known method. For example, the polymer may be hydrogenated in a pressurized hydrogen atmosphere at 1-100 atm in the presence of a known hydrogenation catalyst (e.g. homogeneous hydrogenation catalyst, heterogeneous hydrogenation catalyst).

The polymer prepared as above may be modified with the compound containing an ester group and/or a carboxyl group to provide the polymer mixture. As used herein, the term "ester group" refers to a group represented by —O—C(=O)—R or —C(=O)—O—R (R: a monovalent saturated or unsaturated hydrocarbon group), and the term "carboxyl group" refers to a group represented by —C(=O)—O—H.

The compound (modifier) containing an ester group and/or a carboxyl group is not particularly limited, as long as it contains these functional groups. Examples thereof include carboxylic anhydrides, such as succinic anhydride, butylsuccinic anhydride, 1,2-cyclohexanedicarboxylic anhydride, decylsuccinic anhydride, dodecylsuccinic anhydride, hexadecylsuccinic anhydride, 4-methylcyclohexane-1,2-dicarboxylic anhydride, octadecylsuccinic anhydride, n-octylsuccinic anhydride, n-tetradecylsuccinic anhydride, glutaric anhydride, 1,1-cyclopentanediacetic anhydride, 3,3-dimethylglutaric anhydride, 2,2-dimethylglutaric anhydride, 3-methylglutaric anhydride, 4-tert-butylphthalic anhydride, 4-methylphthalic anhydride, 3-methylphthalic anhydride, and maleic anhydride; methyl bromoacetate, ethyl bromoacetate, i-propyl bromoacetate, t-butyl bromoacetate, benzyl bromoacetate, butyl 2-methylbromoacetate, t-butyl 2-methylbromoacetate, ethyl 2,2-dimethylbromoacetate, t-butyl 2,2-dimethylbromoacetate, ethyl 2-diethylbromoacetate, methyl 2-phenylbromoacetate, methyl 3-bromopropanoate, ethyl 3-bromopropanoate, methyl 2-methyl-3-bromopropanoate, methyl 4-bromobutanoate, ethyl 4-bromobutanoate, methyl 2-methyl-4-chlorobutanoate, ethyl 6-bromohexanoate, ethyl 5-bromopentanoate, methyl cyanoformate, methyl chloroformate, ethyl chloroformate, i-propyl chloroformate, i-butyl chloroformate, t-butyl chloroformate, pentyl chloroformate, hexyl chloroformate, heptyl chloroformate, octyl chloroformate, decyl chloroformate, dodecyl chloroformate, hexadecyl chloroformate, phenyl chloroformate, and benzyl chloroformate; acrylic acid esters such as t-butyl acrylate, methyl acrylate, and ethyl acrylate; and acrylic acid, methacrylic acid, itaconic acid, oxalic acid, malonic acid, succinic acid, glutaric acid, adipic acid, azelaic acid, sebacic acid, maleic acid, fumaric acid, and citraconic acid. In terms of achieving good processability, abrasion resistance, handling stability, fuel economy, and wet grip performance, methyl cyanoformate, acrylic acid esters, such as t-butyl acrylate and methyl acrylate, and carboxylic anhydrides, such as 4-methylcyclohexane-1,2-dicarboxylic anhydride and maleic anhydride are preferred among these. More preferred are carboxylic anhydrides, with maleic anhydride being still more preferred.

The method for the modification with the modifier is not particularly limited and may be a method of bringing the polymer and the modifier into contact with each other. More specifically, the polymer and the aforementioned compound can be reacted to prepare a polymer mixture containing a modified polymer, for example, by: a method (1) of adding the compound to the solution of the terminally active polymer produced by the above-mentioned anionic polymerization (without quenching), and stirring the mixture at a predetermined temperature for a certain period of time; or a method (2) of adding the compound after quenching, and then stirring the mixture at a predetermined temperature for a certain period of time; or, alternatively, a method (3) of once terminating (quenching) the reaction in the solution of the terminally active polymer produced by the above-mentioned anionic polymerization to prepare the unmodified polymer, then treating the polymer again with a reagent (e.g. a radical initiator) in a hydrocarbon solvent, further adding the predetermined modifier, and stirring the mixture at a predetermined temperature for a certain period of time.

In the modification reaction according to the method (1), for good modification, the amount of the compound per 100 parts by mass of the polymer is preferably 0.001 parts by mass or more, more preferably 1 part by mass or more, whereas it is preferably 200 parts by mass or less, more preferably 50 parts by mass or less, still more preferably 10 parts by mass or less.

The temperature and time for the modification reaction in the method (1) can be appropriately set, and are typically 0° C. to 50° C. (preferably 20° C. to 40° C.) and 5 minutes to 6 hours, respectively. The stirring method is not particularly limited and may be a known method.

Typically, in order to terminate the polymerization reaction after modification, an additive such as water, alcohol, or acid is combined. Moreover, a known antioxidant may optionally be combined. In accordance with the method (1), a polymer mixture containing a terminally modified polymer can be prepared.

In the method (2), the addition of the compound after quenching may be carried out, for example, by dissolving the polymer, which is produced by the above-mentioned anionic polymerization and subsequent quenching, in a randomizer and optionally a solvent, such as an organic solvent, to prepare a solution, and then adding an organolithium compound and the aforementioned compound to the solution. The polymer may be a commercially available polymer. In accordance with the method (2), a polymer mixture containing a backbone-modified polymer can be prepared.

The organic solvent, randomizer, and organolithium compound for the method (2) are preferably as described above.

The amount of randomizer added in the method (2) per mole of organolithium compound is preferably 0.01 molar equivalents or more, more preferably 0.05 molar equivalents or more, whereas it is preferably 1000 molar equivalents or less, more preferably 500 molar equivalents or less.

The amount of organolithium compound used in the method (2) per gram of the polymer is preferably 0.00001 mol or more, more preferably 0.0001 mol or more, whereas it is preferably 0.1 mol or less, more preferably 0.01 mol or less.

Moreover, the amount of the compound added and the temperature and time for the modification reaction in the method (2) can be appropriately set, and are preferably as mentioned in the method (1).

In the method (3), the method for terminating the reaction at the active end is not particularly limited and may be carried out for example by adding an additive, such as water, alcohol or acid. The hydrocarbon solvent may be as used in the polymerization. Examples of the radical initiators include azo compounds, such as 2,2'-azobis (isobutyronitrile) (AIBN), and organolithium compounds described above. In accordance with the method (3), a polymer mixture containing a backbone-modified polymer can be prepared.

For good modification, the amount of radical initiator used in the method (3) per 100 parts by mass of the polymer is preferably 0.1 parts by mass or more, more preferably 1 part by mass or more, whereas it is preferably 200 parts by mass or less, more preferably 30 parts by mass or less.

For good modification, the amount of modifier used in the method (3) per 100 parts by mass of the polymer is preferably 0.001 parts by mass or more, more preferably 0.5 parts by mass or more, still more preferably 1 part by mass or more, whereas it is preferably 200 parts by mass or less, more preferably 50 parts by mass or less, still more preferably 10 parts by mass or less.

The temperature and time for the modification reaction in the method (3) can be appropriately set, and are typically 0° C. to 80° C. (preferably 40° C. to 70° C.) and 5 minutes to 6 hours, respectively. The stirring method is not particularly limited and may be any known method. Typically, in order to terminate the polymerization reaction after modification (stirring), an additive, such as water, alcohol, or acid is added. Moreover, a known antioxidant may optionally be combined.

The polymer mixture obtained as described above may contain a modified polymer containing a modified group represented by the formula (1) below which is derived from the compound containing an ester group and/or a carboxyl group, or multimers (e.g. dimer, trimer) of the modified polymer, the formula (1) being:

wherein A represents a divalent saturated or unsaturated hydrocarbon group; $R^1$ represents $OR^4$ or a group represented by the formula (2) below; and $R^4$ represents a hydrogen atom or a monovalent saturated or unsaturated hydrocarbon group, the formula (2) being:

wherein B represents a divalent saturated or unsaturated hydrocarbon group; and $R^5$ represents a hydrogen atom or a monovalent saturated or unsaturated hydrocarbon group.

The symbol A may be any divalent saturated or unsaturated hydrocarbon group without limitations, and examples thereof include linear, branched or cyclic alkylene groups, alkenylene groups, and arylene groups. For excellent fuel economy and abrasion resistance, groups represented by the following formula (3) are preferred among these:

wherein m represents an integer of from 0 to 6; and $R^2$ and $R^3$ are the same as or different from each other, each representing a hydrogen atom, a $C_{1-2}$ hydrocarbon group, or an aryl group.

In the formula, m represents an integer of from 0 to 6, preferably an integer of from 0 to 2.

Examples of the $C_{1-2}$ hydrocarbon groups for $R^2$ and $R^3$ include methyl and ethyl groups. Examples of the aryl groups for $R^2$ and $R^3$ include phenyl and benzyl groups. $R^2$ and $R^3$ are each preferably a hydrogen atom.

The modified group represented by the above formula (1) may or may not contain the divalent saturated or unsaturated hydrocarbon group represented by A.

The monovalent saturated or unsaturated hydrocarbon group for $R^4$ is not particularly limited, and examples thereof include linear, branched or cyclic alkyl groups, alkenyl groups, and aryl groups. In particular, $C_{1-16}$ hydrocarbon groups are preferred, and examples thereof include alkyl groups, such as methyl, ethyl, propyl, butyl, pentyl, hexyl, heptyl, octyl, decyl, dodecyl, or hexadecyl; and aryl groups, such as phenyl or benzyl. $R^4$ is preferably a $C_{1-16}$ alkyl group, and more preferably a $C_{1-5}$ alkyl group.

The symbol B may be any divalent saturated or unsaturated hydrocarbon group without limitations, including hydrocarbon groups as mentioned for A. In particular, groups represented by any of the formulas (4) to (7) below are preferred, groups represented by the formula (5) or (7) are more preferred, and groups represented by the formula (5) are still more preferred.

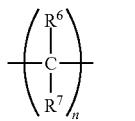
(4)

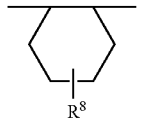
(5)

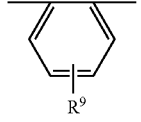
(6)

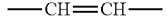
(7)

In the formulas, n represents an integer of 2 or 3; $R^6$ and $R^7$ are the same as or different from each other and each represent a hydrogen atom or a $C_{1-18}$ hydrocarbon group; $R^8$ represents a hydrogen atom or a methyl group; and $R^9$ represents a hydrogen atom or a $C_{1-4}$ hydrocarbon group.

Examples of the $C_{1-18}$ hydrocarbon groups for $R^6$ and $R^7$ include alkyl groups, such as methyl, ethyl, propyl, butyl, pentyl, hexyl, heptyl, octyl, decyl, dodecyl, or hexadecyl; and aryl groups, such as phenyl or benzyl.

$R^8$ is preferably a methyl group.

Examples of the $C_{1-4}$ hydrocarbon groups for $R^9$ include methyl, ethyl, propyl, and butyl groups.

The monovalent saturated or unsaturated hydrocarbon group for $R^5$ is not particularly limited, and examples thereof include hydrocarbon groups as mentioned for $R^4$, such as $C_{1-6}$ hydrocarbon groups (e.g. methyl, ethyl, propyl, butyl, pentyl, hexyl). $R^5$ is preferably a hydrogen atom.

In the polymer mixture obtained as described above, the modified group is preferably present in a proportion of at least 0.1 groups on average per molecule of the polymer in the polymer mixture.

The average number of modified groups (the proportion of modified groups) per molecule of the polymer herein is determined by the method described later in the examples.

The weight average molecular weight (Mw) of the polymer mixture is $1.0 \times 10^3$ or more, preferably $2.0 \times 10^3$ or more, more preferably $4.0 \times 10^3$ or more. If Mw is less than $1.0 \times 10^3$, a large hysteresis loss which makes it difficult to achieve satisfactory fuel economy tends to be caused and, at the same time, abrasion resistance and handling stability tend to decrease. Mw is $1.0 \times 10^5$ or less, preferably $5.0 \times 10^4$ or less, more preferably $1.0 \times 10^4$ or less, and still more preferably $6.0 \times 10^3$ or less. If Mw is more than $1.0 \times 10^5$, processability and wet grip performance may be deteriorated.

The weight average molecular weight (Mw) herein is measured by the method described later in the examples.

The polymer mixture preferably has a viscosity (cps.) at 25° C. of $1.0 \times 10^4$ or higher, more preferably $1.2 \times 10^4$ or higher. If the viscosity is lower than $1.0 \times 10^4$, the resulting rubber composition tends to fail to secure satisfactory viscosity properties, resulting in reduced wet grip performance. The viscosity is preferably $8.0 \times 10^5$ or lower, more preferably $2.0 \times 10^5$ or lower, still more preferably $8.0 \times 10^4$ or lower, and particularly preferably $3.0 \times 10^4$ or lower. If the viscosity is higher than $8.0 \times 10^5$, the resulting rubber composition tends to have an increased Mooney viscosity and remarkably poor processability (kneading processability, extrusion processability).

The viscosities at 25° C. herein are measured by the method described later in the examples.

The polymer mixture (preferably a styrene-butadiene copolymer in the polymer mixture) preferably has a styrene content of 5% by mass or more, more preferably 10% by mass or more. If the styrene content is less than 5% by mass, then satisfactory fuel economy, processability, abrasion resistance, and wet grip performance may not be obtained. The styrene content is preferably 45% by mass or less, and more preferably 35% by mass or less. If the styrene content is more than 45% by mass, fuel economy, processability, abrasion resistance, and wet grip performance tend to be deteriorated.

The styrene content herein is measured by the method described later in the examples.

In view of fuel economy, the polymer mixture preferably has a vinyl content of 80 mol % or less, more preferably 75 mol % or less, based on 100 mol % of conjugated diene units. The vinyl content is also preferably 20 mol % or more, more preferably 25 mol % or more, in view of wet grip performance.

The vinyl content is determined by infrared spectroscopic analysis, from an absorption intensity at around 910 cm$^{-1}$ which is the absorption peak of vinyl group.

In the rubber composition of the present invention, the amount of the polymer mixture per 100 parts by mass of the rubber component is preferably 0.5 parts by mass or more, more preferably 1 part by mass or more, and still more preferably 3 parts by mass or more. Less than 0.5 parts by mass of the polymer mixture may not sufficiently improve processability, abrasion resistance, handling stability, fuel economy, and wet grip performance. The amount is preferably 50 parts by mass or less, more preferably 20 parts by mass or less, still more preferably 15 parts by mass or less, and particularly preferably 8 parts by mass or less. More than 50 parts by mass of the polymer mixture tends to decrease abrasion resistance.

It should be noted that the polymer mixture is not included in the rubber component of the rubber composition of the present invention.

Examples of materials that can be included in the rubber component in the present invention include diene rubbers such as natural rubber (NR), isoprene rubber (IR), polybutadiene rubber (BR), styrene butadiene rubber (SBR), acrylonitrile butadiene rubber (NBR), chloroprene rubber (CR), butyl rubber (IIR), and styrene-isoprene-butadiene copolymer rubber (SIBR). In terms of providing balanced grip performance and abrasion resistance, NR, BR, and SBR are preferred, and SBR is more preferred. Also, the combined uses of NR and SBR, of BR and SBR, and of NR, BR, and SBR are suitable, and the combined use of BR and SBR is more suitable.

SBR is not particularly limited, and examples thereof include emulsion-polymerized styrene butadiene rubber (E-SBR), and solution-polymerized styrene butadiene rubber (S-SBR).

The styrene content in SBR is preferably 10% by mass or more, more preferably 25% by mass or more, and still more preferably 30% by mass or more. The styrene content is also preferably 50% by mass or less, and more preferably 45% by mass or less. When the styrene content falls within the range mentioned above, good fuel economy, wet grip performance, and abrasion resistance can be obtained.

The styrene content can be calculated by $H^1$-NMR measurement.

In terms of providing balanced fuel economy and abrasion resistance, the SBR content based on 100% by mass of the rubber component is preferably 60% by mass or more, more preferably 70% by mass or more. The SBR content may be 100% by mass, but is preferably 95% by mass or less, more preferably 90% by mass or less. When the SBR content falls within the range mentioned above, good fuel economy, wet grip performance, abrasion resistance, and handling stability can be obtained.

If the SBR content is less than 70% by mass, the tan δ peak temperature tends to decrease, resulting in reduced wet grip performance and handling stability.

BR is not particularly limited, and examples thereof include BR1220 from ZEON CORPORATION, high cis BRs such as BR130B and BR150B from Ube Industries, Ltd., and BRs containing syndiotactic polybutadiene crystals, such as VCR412 and VCR617 from Ube Industries, Ltd. For good abrasion resistance, the cis content in BR is preferably 90% by mass or more.

The BR content based on 100% by mass of the rubber component is preferably 5% by mass or more, more preferably 10% by mass or more, in terms of providing balanced fuel economy and abrasion resistance. The BR content is preferably 40% by mass or less, more preferably 30% by mass or less. When the BR content falls within the range mentioned above, good abrasion resistance, wet grip performance, and handling stability can be obtained.

If the BR content is more than 30% by mass, the tan δ peak temperature tends to decrease, resulting in reduced wet grip performance and handling stability.

The rubber composition of the present invention contains silica. This provides good reinforcement and thereby contributes to excellent wet grip performance, abrasion resistance, and handling stability as well as to excellent fuel economy.

Examples of silica include dry silica (anhydrous silicic acid) and wet silica (hydrous silicic acid). Wet silica is preferred because it has many silanol groups.

The nitrogen adsorption specific surface area ($N_2SA$) of silica is preferably 50 $m^2/g$ or more, more preferably 80 $m^2/g$ or more. Silica with a $N_2SA$ of less than 50 $m^2/g$ tends to produce a low reinforcing effect, failing to provide satisfactory abrasion resistance and handling stability. The $N_2SA$ is also preferably 300 $m^2/g$ or less, more preferably 250 $m^2/g$ or less, and still more preferably 200 $m^2/g$ or less. Silica with a $N_2SA$ of more than 300 $m^2/g$ tends to have poor dispersibility, resulting in an increased hysteresis loss and reduced fuel economy. Additionally, it tends to lead to reduced abrasion resistance.

The $N_2SA$ of silica herein is determined by the BET method in accordance with ASTM D3037-93.

In the rubber composition of the present invention, the amount of silica per 100 parts by mass of the rubber component is preferably 10 parts by mass or more, more preferably 40 parts by mass or more, and still more preferably 70 parts by mass or more. Less than 10 parts by mass of silica tends to produce a low reinforcing effect, failing to provide satisfactory abrasion resistance and handling stability. In addition, it tends not to provide good fuel economy and wet grip performance. The amount of silica is preferably 150 parts by mass or less, more preferably 120 parts by mass or less, and still more preferably 100 parts by mass or less. More than 150 parts by mass of silica tends to have poor processability and dispersibility, resulting in reduced abrasion resistance and fuel economy.

Less than 70 parts by mass of silica tends to lead to reduction in tan δ peak temperature, rubber hardness, and tan δ at 70° C., and therefore reduction in abrasion resistance, wet grip performance, and handling stability.

The silica used may be a single type of silica with the same $N_2SA$ value or a combination of multiple types of silica with different $N_2SA$ values. In particular, the combined use of a silica (1) that has a nitrogen adsorption specific surface area of at least 50 $m^2/g$ but less than 120 $m^2/g$ and a silica (2) that has a nitrogen adsorption specific surface area of 120 $m^2/g$ or more is preferred for more suitable processability, abrasion resistance, and wet grip performance.

The $N_2SA$ of silica (1) is 50 $m^2/g$ or more, preferably 80 $m^2/g$ or more, and more preferably 90 $m^2/g$ or more. The silica (1) having a $N_2SA$ of less than 50 $m^2/g$ tends to produce a low reinforcing effect, failing to provide satisfactory abrasion resistance and handling stability. The $N_2SA$ of silica (1) is also less than 120 $m^2/g$. The silica (1) having a $N_2SA$ of 120 $m^2/g$, or more, when combined with the silica (2), tends to have a small effect.

The silica (1) is not particularly limited, as long as it has a nitrogen adsorption specific surface area falling within the range mentioned above. For example, ULTRASIL 360 from Degussa, ZEOSIL 115GR from Rhodia and the like are available. Only one type of silica (1) may be used, or two or more types thereof may be used in combination.

In the rubber composition of the present invention, the amount of silica (1) per 100 parts by mass of the rubber component is preferably 5 parts by mass or more, more preferably 10 parts by mass or more, and still more preferably 30 parts by mass or more. Less than 5 parts by mass of silica (1) tends to produce a low reinforcing effect, failing to provide satisfactory abrasion resistance and handling stability. Additionally, such an amount of silica (1) tends not to provide good fuel economy and wet grip performance. The amount of silica (1) is preferably 80 parts by mass or less, and more preferably 55 parts by mass or less. More than 80 parts by mass of silica (1) tends to have poor processability and dispersibility, resulting in reduced abrasion resistance and fuel economy.

The $N_2SA$ of silica (2) is 120 $m^2/g$ or more, preferably 140 $m^2/g$ or more, and more preferably 150 $m^2/g$ or more. The silica (2) having a $N_2SA$ of less than 120 $m^2/g$, when combined with the silica (1), tends to have a small effect. The $N_2SA$ of silica (2) is also preferably 300 $m^2/g$ or less, more preferably 250 $m^2/g$ or less, and still more preferably 200 $m^2/g$ or less. The silica (2) having a $N_2SA$ of more than 300 $m^2/g$ tends to have poor dispersibility, resulting in an increased hysteresis loss and reduced fuel economy. Additionally, it tends to lead to reduced abrasion resistance.

The nitrogen adsorption specific surface areas of silica (1) and of silica (2) preferably satisfy the following formula:

(Nitrogen adsorption specific surface area of silica (2))/(Nitrogen adsorption specific surface area of silica (1))≥1.4

The ratio is more preferably 1.42 or greater, whereas it is preferably 3 or less, more preferably 2 or less, and still more preferably 1.6 or less. When the ratio falls within the range mentioned above, the effect of combined silica (1) and silica (2) can be more suitably achieved.

In the above formula, when multiple types of silica (1) are used, the nitrogen adsorption specific surface area of silica (1) means the average nitrogen adsorption specific surface area per mass of the multiple types of silica (1). The same applies to the nitrogen adsorption specific surface area of silica (2).

The silica (2) may be any silica having a nitrogen adsorption specific surface area of 120 $m^2/g$ or more without limitations. For example, Zeosil 1205 MP from Rhodia, ZEOSIL 1165 MP from Rhodia and the like are available. Only one type of silica (2) may be used, or two or more types thereof may be used in combination.

In the rubber composition of the present invention, the amount of silica (2) per 100 parts by mass of the rubber component is preferably 10 parts by mass or more, and more preferably 40 parts by mass or more. Less than 10 parts by mass of silica (2) tends to produce a low reinforcing effect, failing to provide satisfactory abrasion resistance and handling stability. Additionally, such an amount of silica (2) tends not to provide good fuel economy and wet grip performance. The amount of silica (2) is preferably 100 parts by mass or less, and more preferably 80 parts by mass or less. More than 100 parts by mass of silica (2) tends to have poor processability and dispersibility, resulting in reduced abrasion resistance and fuel economy.

The combined amount of silica (1) and silica (2) is preferably as mentioned above for the amount of silica.

The amount of silica (1) and the amount of silica (2) preferably satisfy the following formula:

(Amount of silica (1))×0.06≤(Amount of silica (2))≤ (Amount of silica (1))×15.

The amount of silica (2) is preferably at least 0.06 times, more preferably at least 0.1 times, still more preferably at least 0.3 times, as large as the amount of silica (1). If the amount of silica (2) is less than 0.06 times as large as the amount of silica (1), abrasion resistance and handling stability tend to be reduced. The amount of silica (2) is also preferably at most 15 times, more preferably at most 7 times, still more preferably at most 4 times, as large as the amount of silica (1). If the amount of silica (2) is more than 15 times as large as the amount of silica (1), fuel economy, processability, and abrasion resistance will be reduced.

The rubber composition of the present invention preferably contains a silane coupling agent along with silica. Examples of the silane coupling agents include sulfide silane coupling agents, mercapto silane coupling agents, vinyl silane coupling agents, amino silane coupling agents, glycidoxy silane coupling agents, nitro silane coupling agents, and chloro silane coupling agents. In view of the effect of improving reinforcement, and the like, bis(3-triethoxysilylpropyl)disulfide is preferred among these.

The amount of silane coupling agent per 100 parts by mass of silica is preferably 1 part by mass or more, and more preferably 4 parts by mass or more. Less than 1 part by mass of silane coupling agent may produce an insufficient coupling effect, resulting in reduced processability, fuel economy, abrasion resistance, and handling stability. The amount of silane coupling agent is preferably 15 parts by mass or less, and more preferably 8 parts by mass or less. If the amount is more than 15 parts by mass, an excess of silane coupling agent may be left, causing the resulting rubber composition to have reduced processability and abrasion resistance.

The rubber composition of the present invention contains carbon black. This provides good reinforcement and thereby contributes to excellent wet grip performance, abrasion resistance, and handling stability.

The nitrogen adsorption specific surface area ($N_2SA$) of carbon black is preferably 60 $m^2/g$ or more, and more preferably 90 $m^2/g$ or more. Carbon black having a $N_2SA$ of less than 60 $m^2/g$ may fail to provide satisfactory wet grip performance, abrasion resistance, and handling stability. The $N_2SA$ of carbon black is preferably 200 $m^2/g$ or less, more preferably 160 $m^2/g$ or less, and still more preferably 130 $m^2/g$ or less. Carbon black having a $N_2SA$ of more than 200 $m^2/g$ may have poor dispersibility, resulting in deteriorated processability as well as insufficient abrasion resistance and fuel economy.

The $N_2SA$ of carbon black can be determined in accordance with JIS K 6217-2:2001.

The dibutyl phthalate oil absorption (DBP) of carbon black is preferably 50 ml/100 g or more, and more preferably 90 ml/100 g or more. If DBP is less than 50 ml/100 g, satisfactory wet grip performance, abrasion resistance, and handling stability may not be obtained. The DBP of carbon black is also preferably 200 ml/100 g or less, and more preferably 135 ml/100 g or less. Carbon black having a DBP of more than 200 ml/100 g may have poor dispersibility, resulting in deteriorated processability as well as insufficient abrasion resistance and fuel economy.

The DBP of carbon black can be determined in accordance with JIS K6217-4: 2001.

The amount of carbon black per 100 parts by mass of the rubber component is preferably 5 parts by mass or more. Less than 5 parts by mass of carbon black may fail to provide satisfactory wet grip performance, abrasion resistance, and handling stability. The amount of carbon black is also preferably 150 parts by mass or less, more preferably 100 parts by mass or less, still more preferably 50 parts by mass or less, and particularly preferably 20 parts by mass or less. More than 150 parts by mass of carbon black may have poor dispersibility, resulting in deteriorated processability as well as insufficient abrasion resistance and fuel economy.

The rubber composition of the present invention may appropriately contain, in addition to the above-mentioned components, compounding agents generally used for the preparation of rubber compositions, such as reinforcing filler (e.g. clay), oil, various antioxidants, stearic acid, zinc oxide, wax, vulcanizing agents, and vulcanization accelerators.

In the rubber composition of the present invention, the amount of oil per 100 parts by mass of the rubber component is preferably 5 parts by mass or more, and more preferably 10 parts by mass or more. If the amount of oil is less than 5 parts by mass, the resulting rubber compound tends to have poor cohesiveness during kneading, resulting in deteriorated processability. The amount of oil is also preferably 60 parts by mass or less, and more preferably 50 parts by mass or less. More than 60 parts by mass of oil tends to reduce rubber hardness, resulting in reduced handling stability. Additionally, such an amount of oil tends to reduce abrasion resistance.

The rubber composition of the present invention may be prepared by a conventional method. Specifically, the components mentioned above are kneaded with a known kneading machine generally used in the rubber industry, such as a Banbury mixer, a kneader, or an open roll mill, and then vulcanized.

The rubber composition (vulcanized rubber composition) of the present invention has a tan δ peak temperature of −20° C. or higher, more preferably −18° C. or higher, still more preferably −16° C. or higher. If the tan δ peak temperature is lower than −20° C., the energy loss of the resulting rubber, which is associated with wet grip performance, will be reduced so that satisfactory wet grip performance cannot be achieved. Additionally, satisfactory handling stability cannot be achieved. The tan δ peak temperature is also preferably 0° C. or lower, and more preferably −5° C. or lower. If the tan δ peak temperature is higher than 0° C., the complex modulus in the viscoelasticity region of the resulting rubber, which is associated with wet grip performance, tends to be high enough to remarkably reduce the ability to follow the road surface contours, resulting in reduced wet grip performance. In addition, fuel economy may be deteriorated.

The tan δ peak temperature herein means, in a temperature dependence curve of tan δ (a curve prepared by plotting tan δ values measured at different temperatures as a function of temperature), the temperature that gives the maximum tan δ value (the temperature corresponding to the highest peak of the curve).

The tan δ peak temperature is measured by the method described later in the examples.

The rubber composition (vulcanized rubber composition) of the present invention has a rubber hardness of 63 or higher, preferably 65 or higher, and more preferably 67 or higher. If a rubber composition having a rubber hardness of lower than 63 is used in a tire, the resulting tire fails to secure satisfactory cornering power and thus has deteriorated kinematic performance (e.g. handling stability). The rubber hardness is also 75 or lower, preferably 73 or lower. If a rubber composition having a rubber hardness of more than 75 is used in a tire, the resulting tire tends to easily receive the load input from the road surface and thus gives increased noise.

The rubber hardness is measured by the method described later in the examples.

The rubber composition (vulcanized rubber composition) of the present invention has a tan δ at 70° C. of 0.15 or greater, preferably 0.18 or greater, and more preferably 0.20 or greater. If the tan δ value is less than 0.15, the resulting rubber has an increased temperature dependency and thus cannot offer wet grip performance over a wide temperature range. The tan δ value is 0.45 or lower, preferably 0.40 or lower, more preferably 0.30 or lower, and still more preferably 0.25 or lower. If a rubber composition having a tan δ greater than 0.45 is used in a tire, the resulting rubber will develop an excessively high heat build-up during driving at a high speed, failing to secure satisfactory high-speed durability. Additionally, fuel economy is reduced.

The tan δ at 70° C. is determined by the method described later in the examples.

The rubber composition (vulcanized rubber composition) of the present invention has a specific tan δ peak temperature, a specific rubber hardness, and a specific tan δ value at 70° C. The rubber composition having such properties can be prepared by combining carbon black, silica, and the polymer mixture, and then compounding these components and other components mentioned above according to a suitable embodiment (e.g. the types and amounts of the components to be compounded) mentioned above.

Specifically, the rubber composition may be prepared by: (1) setting the SBR content to 70% by mass or more based on 100% by mass of the rubber component; (2) setting the BR content to 30% by mass or less based on 100% by mass of the rubber component; (3) setting the amount of silica to 70 parts by mass or more per 100 parts by mass of the rubber component; (4) setting the amount of oil to 5 parts by mass or more per 100 parts by mass of the rubber component; (5) using SBR having a styrene content of 30% by mass or more; (6) setting the acetone extractable content (the amount of acetone-extractable matter in the vulcanized rubber composition) to 17 to 25% by mass as determined in accordance with the method A in JIS K 6229 (1998); and/or (7) setting the mass ratio of carbon black to silica (carbon black/silica) to less than 0.65 (preferably 0.45 or less, more preferably 0.25 or less).

The rubber composition of the present invention can be suitably used for various tire components (e.g. tread (cap tread), sidewall, base tread, clinch apex, belt topping rubber, carcass topping rubber, innerliner, insulation). The rubber composition can be more suitably used in a tread or a sidewall, still more suitably in a tread, in terms of greatly contributing to fuel economy.

The pneumatic tire according to the present invention may be formed from the rubber composition by a conventional method. Specifically, the unvulcanized rubber composition containing the above-mentioned components is extruded into the shape of a tire component, assembled with other tire components and formed on a tire building machine by a usual method to build an unvulcanized tire, which is then heated and pressed in a vulcanizer to prepare a tire.

The pneumatic tire of the present invention can be suitably used for tires for passenger cars, trucks and buses, or motorcycles, and for racing tires and the like, and particularly suitably used for tires for passenger cars.

EXAMPLES

The present invention will be described in more detail by reference to examples which are not intended to limit the scope of the present invention.

The chemicals used for the synthesis and polymerization in the preparation examples are listed below. The chemicals were refined by conventional methods, if necessary.

n-Hexane: product from KANTO CHEMICAL CO., INC.
1,3-Butadiene: product from Takachiho Chemical Industrial Co., Ltd.
Styrene: product from KANTO CHEMICAL CO., INC.
Tetramethylethylenediamine: product from KANTO CHEMICAL CO., INC.
1.6 M n-butyllithium in hexane: product from KANTO CHEMICAL CO., INC.
2,6-Di-t-butyl-p-cresol: product from Ouchi Shinko Chemical Industrial Co., Ltd.

Modifier (1): maleic anhydride from Tokyo Chemical Industry Co., Ltd.
Modifier (2): methyl acrylate from Tokyo Chemical Industry Co., Ltd.
AIBN: 2,2'-azobis(isobutyronitrile)

Preparation Example 1 (Synthesis of Styrene-Butadiene Copolymers (1) to (5))

A 3-L autoclave with a stirrer was sufficiently purged with nitrogen and then charged with n-hexane, 1,3-butadiene, styrene, and tetramethylethylenediamine according to each recipe shown in Table 1, and the temperature in the autoclave was adjusted to 25° C. Next, 1.6 M n-butyllithium in hexane was added to the autoclave and the mixture was polymerized at an elevated temperature (30° C.) for 60 minutes until the conversion ratio of monomers was confirmed to be 99%. Thereto was added 1.5 g of 2,6-di-t-butyl-p-cresol as an antioxidant. Thus, styrene-butadiene copolymers (1) to (5) were prepared.

Preparation Example 2 (Synthesis of Modified Styrene-Butadiene Copolymers (1) to (6))

A flask was charged with one of the styrene-butadiene copolymers (1) to (5), n-hexane, and AIBN according to each recipe shown in Table 2, and the temperature in the flask was adjusted to 60° C. Next, the modifier was added to the flask and the mixture was stirred for one hour. Then the resulting reaction solution was treated with methanol, and 1.5 g of 2,6-di-t-butyl-p-cresol was added thereto as an antioxidant. Thus, modified styrene-butadiene copolymers (1) to (6) were prepared.

The obtained styrene-butadiene copolymers (1) to (5) and modified styrene-butadiene copolymers (1) to (6) (polymer mixtures) were evaluated for the following items. The results are shown in Tables 1 and 2.

(Viscosity at 25° C.)
Viscosity was measured at 25° C. with a BROOKFIELD DV II-viscometer (BROOKFIELD ENGINEERING LABORATORIES, INS.) with a Helipath T-C spindle at 10 rpm.

(Determination of Styrene Content)
$H^1$-NMR measurement was performed at 25° C. using a JEOL JNM-A 400NMR device. The ratio of the amount of phenyl protons from the styrene unit at 6.5 to 7.2 ppm to the amount of vinyl protons from the butadiene unit at 4.9 to 5.4 ppm was determined from the resulting spectrum. From the ratio, the styrene content of each copolymer or each polymer mixture was determined.

(Determination of Weight Average Molecular Weight Mw)
The weight average molecular weight Mw of each copolymer or each polymer mixture was determined with a gel permeation chromatograph (GPC) (GPC-8000 series from Tosoh Corporation; detector: differential refractometer; column: TSKGEL SUPERMULTIPORE HZ-M from Tosoh Corporation) and calibrated with polystyrene standards.

(Determination of Proportion of Modified Groups Per Molecule: Titration Test)
An amount of 0.1 g of KOH was weighed to prepare 100 ml of a MeOH solution. Next, 0.5 g of a sample was weighed and dissolved in 30 ml of toluene and prepared. One drop of phenolphthalein was added to the modified polytail solution, and then the KOH solution was added dropwise to the resulting solution to carry out a titration test. An acid concentration determined by calculation was defined as the modification rate.

TABLE 1

|  |  |  | Styrene-butadiene copolymer | | | | |
|---|---|---|---|---|---|---|---|
|  |  |  | (1) | (2) | (3) | (4) | (5) |
| Recipe | Styrene | g | 31 | 18 | 12 | 12 | 18 |
|  | 1,3-Butadiene | g | 46 | 55 | 68 | 68 | 55 |
|  | Tetramethylethylenediamine | g | 1.6 | 1.6 | 1.2 | 0.6 | 1.6 |
|  | 1.6M n-butyllithium in hexane | mL | 23 | 23 | 16.6 | 8.4 | 230 |
|  | n-Hexane | mL | 1500 | 1500 | 1500 | 1500 | 500 |
| Evaluation | Styrene content | % by mass | 40.3 | 24.7 | 15 | 14.8 | 24.7 |
|  | Weight average molecular weight (Mw) | — | 5000 | 5000 | 5000 | 15000 | 500 |

TABLE 2

|  |  |  | Modified styrene-butadiene copolymer | | | | | |
|---|---|---|---|---|---|---|---|---|
|  |  |  | (1) | (2) | (3) | (4) | (5) | (6) |
| Recipe | Styrene-butadiene copolymer (1) | g | 100 | — | — | — | — | — |
|  | Styrene-butadiene copolymer (2) | g | — | 100 | 100 | — | — | — |
|  | Styrene-butadiene copolymer (3) | g | — | — | — | 100 | — | — |
|  | Styrene-butadiene copolymer (4) | g | — | — | — | — | 100 | — |
|  | Styrene-butadiene copolymer (5) | g | — | — | — | — | — | 100 |
|  | AIBN | g | 4.92 | 4.92 | 4.92 | 4.92 | 4.92 | 4.92 |
|  | n-Hexane | mL | 500 | 500 | 500 | 500 | 500 | 500 |
|  | Modifier (1) | g | 2.06 | 2.06 | — | 2.06 | 2.06 | 2.06 |
|  | Modifier (2) | g | — | — | 1.76 | — | — | — |
| Evaluation | Viscosity | cps. | 17000 | 15000 | 14000 | 15000 | 190000 | 1200 |
|  | Styrene content | % by mass | 40.3 | 24.7 | 24.7 | 15 | 14.8 | 24.7 |
|  | Weight average molecular weight (Mw) | — | 5000 | 5000 | 5000 | 5000 | 15000 | 500 |
|  | Proportion of modified groups per molecule | group | 1 | 1 | 1 | 1 | 1 | 1 |

EXAMPLES AND COMPARATIVE EXAMPLES

The following is the list of the chemicals used in the examples and comparative examples.

BR: BR150B (cis content: 97% by mass) from Ube Industries, Ltd.

SBR: SBR755B (styrene content: 40% by mass; vinyl content: 40% by mass; oil content: 37.5 parts by mass per 100 parts by mass of rubber component) from JSR Corporation Carbon black: N220 (DBP: 115 ml/100 g, $N_2SA$: 110 $m^2$/g) from Cabot Japan K. K.

Low-molecular-weight polybutadiene (1): Ricon 130 (Mn: 2500, Mw: 3200, viscosity (25° C.): 750 cps.) from Cray Valley Low-molecular-weight polybutadiene (2): Ricon 130 MA 20 (Mn: 31000, Mw: 4000, viscosity (25° C.): 35000 cps., modified with maleic anhydride) from Cray Valley Low-molecular-weight polybutadiene (3): Ricon 184 MA 6 (Mn: 9100, Mw: 11000, viscosity (25° C.): 170000 cps., modified with maleic anhydride) from Cray Valley Silica (1): ZEOSIL 115GR ($N_2SA$: 110 $m^2$/g) from Rhodia Silica (2): ZEOSIL 1165 MP ($N_2SA$: 160 $m^2$/g) from Rhodia Silane coupling agent: Silane coupling agent Si75 from Degussa Oil: X-140 from JX Nippon Oil & Energy Corporation Zinc oxide: zinc oxide #1 from Mitsui Mining and Smelting Co., Ltd.

Stearic acid: stearic acid "Tsubaki" from NOF Corporation

Antioxidant: Antigene 6C (N-(1,3-dimethylbutyl)-N'-phenyl-p-phenylenediamine) from Sumitomo Chemical Co., Ltd.

Sulfur: powdered sulfur from Tsurumi Chemical Industry Co., Ltd.

Vulcanization accelerator (1): Nocceler NS (N-tert-butyl-2-benzothiazolyl sulfenamide) from Ouchi Shinko Chemical Industrial Co., Ltd.

Vulcanization accelerator (2): Nocceler D (N,N'-diphenylguanidine) from Ouchi Shinko Chemical Industrial Co., Ltd.

Styrene-butadiene copolymers (1) to (4): Preparation Example 1

Modified styrene-butadiene copolymers (1) to (6): Preparation Example 2

The materials, except the sulfur and vulcanization accelerators, according to each compounding formulation shown in Table 3 were kneaded with a 1.7-L Banbury mixer at 150° C. for 3 minutes to prepare a kneaded mixture. Next, the sulfur and vulcanization accelerators were added to the kneaded mixture, and the mixture was kneaded with an open roll mill at 80° C. for 5 minutes to prepare an unvulcanized rubber composition. The unvulcanized rubber composition was press vulcanized at 170° C. for 15 minutes to prepare a vulcanized rubber composition.

Separately, the unvulcanized rubber composition thus prepared was formed into the shape of a tread and assembled with other tire components to build an unvulcanized tire, which was then press vulcanized at 170° C. for 10 minutes to prepare a test tire (size: 195/65R15).

The unvulcanized rubber compositions, vulcanized rubber compositions, and test tires thus prepared were evaluated for the following items. The results are shown in Table 3.

(Rubber Hardness)

The rubber hardness of each vulcanized rubber composition was determined using a type A durometer in accordance with JIS K 6253-1: "Rubber, vulcanized or thermoplastic—Determination of hardness." Larger values indicate higher rubber hardnesses.

(Tan δ peak temperature)

The tan δ of the vulcanized rubber compositions was measured with a spectrometer (Ueshima Seisakusho Co., Ltd.) at a dynamic strain amplitude of 1% and a frequency of 10 Hz over a measurement temperature range from −80° C. to 80° C. The temperature at which tan δ reaches a peak was determined as the tan δ peak temperature.

(Tan δ (70° C.))

The tan δ of the vulcanized rubber compositions was determined with a spectrometer (Ueshima Seisakusho Co., Ltd.) at a dynamic strain amplitude of 1%, a frequency of 10 Hz, and a temperature of 70° C. Smaller values indicate smaller rolling resistances and higher fuel economy.

(Processability)

In accordance with JIS K 6300-1: 2001 "Rubber, unvulcanized—Physical property—Part 1: Determination of Mooney viscosity and pre-vulcanization characteristics with Mooney viscometer," each unvulcanized rubber composition was preheated for 1 minute to 130° C. and the small rotor of a Mooney viscometer was then rotated. After four minutes' rotation, the Mooney viscosity ($ML_{1+4}$ at 130° C.) of the unvulcanized rubber composition was measured. The results are expressed with indices. Higher indices indicate lower Mooney viscosities and better processability (kneading processability). The indices were calculated using the following equation:

(Mooney viscosity index)=(Mooney viscosity in Comparative Example 1)/(Mooney viscosity of each formulation)×100.

(Abrasion Resistance)

The volume loss of each vulcanized rubber composition was measured with a LAT tester (laboratory abration and skid tester) at a load of 50 N, a speed of 20 km/h, and a slip angle of 5°. The values (abrasion resistance indices) in Table 3 are relative to the volume loss in Comparative Example 1 (=100). Larger values indicate higher abrasion resistance.

(Wet Grip Performance)

Each test tire was mounted on every wheel of a Japanese front-engine, front-wheel-drive (FF) car (engine size: 2000 cc). The braking distance from an initial speed of 100 km/h on a wet asphalt road was determined. The results are expressed with indices. Higher indices indicate better wet skid performance (wet grip performance). The indices were calculated using the following equation:

(Wet grip performance index)=(Braking distance in Comparative Example 1)/(Braking distance with each formulation)×100.

(Handling Stability)

Each test tire was mounted on every wheel of a Japanese front-engine, front-wheel-drive (FF) car (engine size: 2000 cc). The car was driven on a test track of Sumitomo Rubber Industries, Ltd. in Nayoro, Hokkaido, Japan to determine test driver's subjective feel for handling stability. The test tires were rated on a scale of 1 to 10, with 10 being the best, relative to Comparative Example 1 (=6). Higher ratings indicate higher handling stability.

(Acetone Extractable Content)

In accordance with the method for determining acetone extractable content in JIS K6229, the amount of acetone-extractable matter in each vulcanized rubber composition was determined and expressed in % by mass. The acetone extractable content is considered as an index of the concentration of low-molecular-weight organic compounds (e.g. oil, wax) contained in the vulcanized rubber composition. The JIS K6229 (1998) standard specifies two methods (method A and method B). The acetone extractable content determined in accordance with JIS K6229 herein means the acetone extractable content (% by mass) determined by the method A.

TABLE 3

|  |  | Comparative Example |  |  |  |  |  |  |  |  |  | Example |
|---|---|---|---|---|---|---|---|---|---|---|---|---|
|  |  | 1 | 2 | 3 | 4 | 5 | 6 | 7 | 8 | 9 | 10 | 1 |
| Formulation (parts by mass) | BR | 20 | 20 | 20 | 20 | 20 | 20 | 35 | 35 | 10 | 10 | 20 |
|  | SBR | 110 | 110 | 110 | 110 | 110 | 110 | 89.4 | 89.4 | 123.8 | 123.8 | 110 |
|  | Carbon black | 10 | 10 | 10 | 10 | 10 | 10 | 10 | 10 | 10 | 60 | 10 |
|  | Silica (1) | 85 | 85 | 85 | 85 | 85 | 85 | 85 | 60 | 130 | 85 | 85 |
|  | Silica (2) | — | — | — | — | — | — | — | — | — | — | — |
|  | Silane coupling agent | 6.8 | 6.8 | 6.8 | 6.8 | 6.8 | 6.8 | 6.8 | 4.8 | 10.4 | 4 | 6.8 |
|  | Oil | 5 | 5 | 5 | 5 | — | — | 8 | — | 10 | 20 | 8 |
|  | Zinc oxide | 3 | 3 | 3 | 3 | 3 | 3 | 3 | 3 | 3 | 3 | 3 |
|  | Stearic acid | 2 | 2 | 2 | 2 | 2 | 2 | 2 | 2 | 2 | 2 | 2 |
|  | Antioxidant | 2 | 2 | 2 | 2 | 2 | 2 | 2 | 2 | 2 | 2 | 2 |
|  | Sulfur | 2 | 2 | 2 | 2 | 2 | 2 | 2 | 2 | 2 | 2 | 2 |
|  | Vulcanization accelerator (1) | 2 | 2 | 2 | 2 | 2 | 2 | 2 | 2 | 2 | 2 | 2 |
|  | Vulcanization accelerator (2) | 2 | 2 | 2 | 2 | 2 | 2 | 2 | 2 | 2 | 2 | 2 |
|  | Styrene-butadiene copolymer (1) | 5 | — | — | — | — | — | — | — | — | — | — |
|  | Styrene-butadiene copolymer (2) | — | 5 | — | — | — | — | — | — | — | — | — |
|  | Styrene-butadiene copolymer (3) | — | — | 5 | — | — | — | — | — | — | — | — |
|  | Styrene-butadiene copolymer (4) | — | — | — | 5 | — | — | — | — | — | — | — |
|  | Modified styrene-butadiene copolymer (1) | — | — | — | — | — | — | — | — | 5 | 5 | 5 |
|  | Modified styrene-butadiene copolymer (2) | — | — | — | — | — | — | 5 | 5 | — | — | — |
|  | Modified styrene-butadiene copolymer (3) | — | — | — | — | — | — | — | — | — | — | — |
|  | Modified styrene-butadiene copolymer (4) | — | — | — | — | — | — | — | — | — | — | — |
|  | Modified styrene-butadiene copolymer (5) | — | — | — | — | — | — | — | — | — | — | — |
|  | Modified styrene-butadiene copolymer (6) | — | — | — | — | 5 | — | — | — | — | — | — |
|  | Low-molecular-weight polybutadiene (1) | — | — | — | — | — | 5 | — | — | — | — | — |
|  | Low-molecular-weight polybutadiene (2) | — | — | — | — | — | — | — | — | — | — | — |
|  | Low-molecular-weight polybutadiene (3) | — | — | — | — | — | — | — | — | — | — | — |
| Evaluation results | Acetone extractable content (% by mass) | 17.2 | 17.5 | 17.5 | 17.2 | 16.0 | 16.2 | 16.3 | 15.3 | 16.8 | 19.8 | 18.2 |
|  | Carbon black/Silica (mass ratio) | 0.12 | 0.12 | 0.12 | 0.12 | 0.12 | 0.12 | 0.12 | 0.17 | 0.08 | 0.71 | 0.12 |
|  | Rubber hardness | 67 | 67 | 67 | 67 | 67 | 67 | 67 | 58 | 77 | 77 | 67 |
|  | Tan δ peak temperature (° C.) | −16 | −17 | −17 | −17 | −17 | −19 | −24 | −24 | −13 | −13 | −16 |
|  | Tan δ (70° C.) | 0.26 | 0.24 | 0.23 | 0.22 | 0.26 | 0.25 | 0.24 | 0.14 | 0.38 | 0.46 | 0.23 |
|  | Processability | 100 | 98 | 97 | 94 | 100 | 102 | 102 | 102 | 75 | 70 | 104 |
|  | Abrasion resistance | 100 | 98 | 97 | 106 | 95 | 106 | 110 | 95 | 75 | 75 | 101 |
|  | Wet grip performance | 100 | 105 | 103 | 96 | 102 | 98 | 95 | 88 | 95 | 80 | 104 |
|  | Handling stability | 6 | 6 | 6 | 5.75 | 5.75 | 5.5 | 5.5 | 5.5 | 7 | 7.5 | 6.25 |

|  |  | Example |  |  |  |  |  |  |  |  |  |  |
|---|---|---|---|---|---|---|---|---|---|---|---|---|
|  |  | 2 | 3 | 4 | 5 | 6 | 7 | 8 | 9 | 10 | 11 | 12 |
| Formulation (parts by mass) | BR | 20 | 20 | 20 | 20 | 20 | 20 | 20 | 20 | 20 | 20 | 20 |
|  | SBR | 110 | 110 | 110 | 110 | 110 | 110 | 110 | 110 | 110 | 110 | 110 |
|  | Carbon black | 10 | 10 | 10 | 10 | 10 | 10 | 10 | 10 | 10 | 10 | 10 |
|  | Silica (1) | 85 | 85 | 85 | 85 | 85 | 85 | 85 | 85 | 65 | 45 | 20 |
|  | Silica (2) | — | — | — | — | — | — | — | — | 20 | 20 | 65 |
|  | Silane coupling agent | 6.8 | 6.8 | 6.8 | 6.8 | 6.8 | 6.8 | 6.8 | 6.8 | 5.2 | 3.6 | 1.6 |
|  | Oil | 8 | 8 | 10 | 5 | 10 | 15 | 5 | 20 | 5 | 3 | 3 |
|  | Zinc oxide | 3 | 3 | 3 | 3 | 3 | 3 | 3 | 3 | 3 | 3 | 3 |
|  | Stearic acid | 2 | 2 | 2 | 2 | 2 | 2 | 2 | 2 | 2 | 2 | 2 |
|  | Antioxidant | 2 | 2 | 2 | 2 | 2 | 2 | 2 | 2 | 2 | 2 | 2 |
|  | Sulfur | 2 | 2 | 2 | 2 | 2 | 2 | 2 | 2 | 2 | 2 | 2 |
|  | Vulcanization accelerator (1) | 2 | 2 | 2 | 2 | 2 | 2 | 2 | 2 | 2 | 2 | 2 |
|  | Vulcanization accelerator (2) | 2 | 2 | 2 | 2 | 2 | 2 | 2 | 2 | 2 | 2 | 2 |
|  | Styrene-butadiene copolymer (1) | — | — | — | — | — | — | — | — | — | — | — |

TABLE 3-continued

| | | | | | | | | | | | | |
|---|---|---|---|---|---|---|---|---|---|---|---|---|
| | Styrene-butadiene copolymer (2) | — | — | — | — | — | — | — | — | — | — | — |
| | Styrene-butadiene copolymer (3) | — | — | — | — | — | — | — | — | — | — | — |
| | Styrene-butadiene copolymer (4) | — | — | — | — | — | — | — | — | — | — | — |
| | Modified styrene-butadiene copolymer (1) | — | — | — | — | — | — | — | — | — | — | — |
| | Modified styrene-butadiene copolymer (2) | 5 | — | — | — | — | — | 2 | 10 | 5 | 5 | 5 |
| | Modified styrene-butadiene copolymer (3) | — | 5 | — | — | — | — | — | — | — | — | — |
| | Modified styrene-butadiene copolymer (4) | — | — | 5 | — | — | — | — | — | — | — | — |
| | Modified styrene-butadiene copolymer (5) | — | — | — | 5 | — | — | — | — | — | — | — |
| | Modified styrene-butadiene copolymer (6) | — | — | — | — | — | — | — | — | — | — | — |
| | Low-molecular-weight polybutadiene (1) | — | — | — | — | — | — | — | — | — | — | — |
| | Low-molecular-weight polybutadiene (2) | — | — | — | — | 5 | — | — | — | — | — | — |
| | Low-molecular-weight polybutadiene (3) | — | — | — | — | — | 5 | — | — | — | — | — |
| Evaluation results | Acetone extractable content (% by mass) | 18.3 | 18.2 | 18.8 | 17.2 | 18.8 | 20.4 | 17.4 | 21.9 | 17.6 | 18.3 | 17.3 |
| | Carbon black/Silica (mass ratio) | 0.12 | 0.12 | 0.12 | 0.12 | 0.12 | 0.12 | 0.12 | 0.12 | 0.12 | 0.15 | 0.12 |
| | Rubber hardness | 67 | 67 | 67 | 67 | 67 | 67 | 67 | 67 | 67 | 67 | 67 |
| | Tan δ peak temperature (° C.) | −16 | −16 | −16 | −16 | −16 | −16 | −16 | −16 | −16 | −16 | −16 |
| | Tan δ (70° C.) | 0.21 | 0.22 | 0.21 | 0.21 | 0.2 | 0.18 | 0.2 | 0.18 | 0.21 | 0.2 | 0.19 |
| | Processability | 106 | 105 | 103 | 100 | 106 | 102 | 104 | 108 | 107 | 112 | 118 |
| | Abrasion resistance | 103 | 102 | 106 | 106 | 106 | 102 | 106 | 100 | 105 | 106 | 103 |
| | Wet grip performance | 105 | 103 | 103 | 102 | 102 | 102 | 103 | 106 | 106 | 108 | 106 |
| | Handling stability | 6.25 | 6.25 | 6.25 | 6.25 | 6 | 6.25 | 6.25 | 6.25 | 6.25 | 6.25 | 6.25 |

As shown in Table 3, each of the rubber compositions in the examples contained carbon black, silica, and a polymer mixture obtained by modifying a polymer derived from a conjugated diene compound and/or an aromatic vinyl compound with a compound containing an ester group and/or a carboxyl group, the polymer mixture having a weight average molecular weight of from $1.0 \times 10^3$ to $1.0 \times 10^5$, and the vulcanized rubber composition having a tan δ peak temperature of −20° C. or higher, a rubber hardness of from 63 to 75, and a tan δ at 70° C. of from 0.15 to 0.45, and they had improved fuel economy and wet grip performance while maintaining good processability, abrasion resistance, and handling stability or improving them.

The invention claimed is:
1. A rubber composition, comprising:
 5 to 150 parts by mass of carbon black;
 10 to 150 parts by mass of silica, wherein the silica comprises silica (1) that has a nitrogen adsorption specific surface area in the range 50 m²/g to less than 120 m²/g and silica (2) that has a nitrogen adsorption specific surface area of 120 m²/g or more;
 100 parts by mass of a rubber component comprising styrene butadiene rubber; and
 5 to 50 parts by mass of a modified polymer obtained by modifying a styrene-butadiene copolymer, wherein the modified polymer contains a moiety -(A)-C(O)R$^1$ in which R$^1$ is —OR$^4$ or —B—(CO)OR$^5$, A and B being, independently, a divalent saturated or unsaturated hydrocarbon group and R$^4$ and R$^5$ being, independently, hydrogen or a divalent saturated or unsaturated hydrocarbon group, and wherein the modified polymer has a weight average molecular weight of from 1000 to 100,000, wherein the rubber composition has a tan δ peak temperature of −20° C. or higher, a rubber hardness of from 63 to 75, and a tan δ at 70° C. of from 0.15 to 0.45.

2. The rubber composition according to claim 1, wherein A is represented by the following formula (3):

wherein m represents an integer of from 0 to 6; and R$^2$ and R$^3$ are the same as or different from each other and each represent a hydrogen atom, a C$_{1-2}$ hydrocarbon group, or an aryl group, and B is represented by any one of the following formulas (4) to (7):

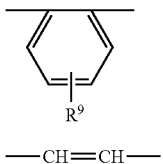 (6)

—CH=CH— (7)

wherein n represents an integer of 2 or 3; $R^6$ and $R^7$ are the same as or different from each other and each represent a hydrogen atom or a $C_{1-18}$ hydrocarbon group; $R^8$ represents a hydrogen atom or a methyl group; and $R^9$ represents a hydrogen atom or a $C_{1-4}$ hydrocarbon group.

3. The rubber composition according to claim 1, wherein the modified group is present in a proportion of at least 0.1 groups on average per molecule of the polymer in the polymer mixture.

4. The rubber composition according to claim 1, wherein the modified polymer has a viscosity at 25° C. of from $1.0 \times 10^4$ to $8.0 \times 10^5$.

5. The rubber composition according to claim 1, wherein the modified polymer has a styrene content of from 5 to 45% by mass.

6. The rubber composition according to claim 1, wherein the modified polymer comprises a backbone-modified polymer.

7. The rubber composition according to claim 1, wherein the nitrogen adsorption specific surface areas and amounts of the silicas (1) and (2) satisfy the following formulas:

(Nitrogen adsorption specific surface area of silica (2))/(Nitrogen adsorption specific surface area of silica (1))≥1.4; and (Amount of silica (1))×0.06≤(Amount of silica (2))≤ (Amount of silica (1))×15.

8. The rubber composition according to claim 1, wherein the rubber composition satisfies at least one of the following conditions (1) to (7):
   (1) a styrene butadiene rubber content is 70% by mass or more based on 100% by mass of a rubber component in the rubber composition;
   (2) a polybutadiene rubber content is 30% by mass or less based on 100% by mass of the rubber component;
   (3) an amount of silica is 70 parts by mass or more per 100 parts by mass of the rubber component;
   (4) an amount of oil is 5 parts by mass or more per 100 parts by mass of the rubber component;
   (5) the rubber composition comprises styrene butadiene rubber having a styrene content of 30% by mass or more;
   (6) an acetone extractable content (an amount of acetone-extractable matter in the vulcanized rubber composition) is 17 to 25% by mass as determined in accordance with the method A in JIS K 6229 (1998); and
   (7) a mass ratio of carbon black to silica (carbon black/silica) is less than 0.65.

9. The rubber composition according to claim 8, wherein the rubber composition satisfies all the conditions (1) to (7).

10. A rubber composition for tires, comprising the rubber composition according to claim 1.

11. A pneumatic tire, formed from the rubber composition according to claim 10.

12. A pneumatic tire, formed from the rubber composition according to claim 2.

* * * * *